(12) United States Patent
Emori et al.

(10) Patent No.: US 7,986,431 B2
(45) Date of Patent: Jul. 26, 2011

(54) INFORMATION PROCESSING APPARATUS, INFORMATION PROCESSING METHOD, AND COMPUTER PROGRAM PRODUCT

(75) Inventors: Mototsugu Emori, Saitama (JP); Takahiro Asai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 903 days.

(21) Appl. No.: 11/522,944

(22) Filed: Sep. 19, 2006

(65) Prior Publication Data

US 2007/0076249 A1 Apr. 5, 2007

(30) Foreign Application Priority Data

Sep. 30, 2005 (JP) ................................. 2005-288133
Jul. 26, 2006 (JP) ................................. 2006-203806

(51) Int. Cl.
*G06F 15/00* (2006.01)
(52) U.S. Cl. ............... 358/1.16; 358/1.15; 707/999.001; 707/999.007; 707/999.1; 707/999.103
(58) Field of Classification Search ................. 358/1.16, 358/1.15; 707/999.001, 999.007, 999.1, 707/999.103
See application file for complete search history.

(56) References Cited

U.S. PATENT DOCUMENTS

| | | | |
|---|---|---|---|
| 6,864,992 B1 * | 3/2005 | Okada | 358/1.15 |
| 2002/0126120 A1 | 9/2002 | Snowdon et al. | |
| 2003/0056171 A1 * | 3/2003 | Yone et al. | 715/505 |
| 2004/0049571 A1 * | 3/2004 | Johnson et al. | 709/224 |
| 2004/0249871 A1 * | 12/2004 | Bazoon | 707/206 |
| 2005/0149498 A1 | 7/2005 | Lawrence et al. | |
| 2005/0243366 A1 * | 11/2005 | Fukuda | 358/1.15 |
| 2006/0047635 A1 * | 3/2006 | Kraenzel et al. | 707/3 |
| 2006/0206447 A1 * | 9/2006 | Komamura et al. | 707/1 |

FOREIGN PATENT DOCUMENTS

| | | |
|---|---|---|
| EP | 1 217 554 A2 | 6/2002 |
| JP | 9-311872 | 12/1997 |
| JP | 10-143519 A | 5/1998 |
| JP | 10-190997 | 7/1998 |
| JP | 2001-290843 | 10/2001 |
| JP | 2002-251304 | 9/2002 |
| JP | 2002-342379 | 11/2002 |
| JP | 2003-271653 | 9/2003 |
| JP | 2004-192221 A | 7/2004 |
| JP | 2005-260355 A | 9/2005 |

OTHER PUBLICATIONS

Machine translation of Japanese Document Publication No. 2001-290843, Tsuda Hiroshi, Oct. 19, 2001.*
U.S. Appl. No. 11/358,428, filed Feb. 22, 2006.
Japanese Office Action issued on Jan. 25, 2011 in corresponding Japanese Application No. 2006-203806.

* cited by examiner

*Primary Examiner* — David K Moore
*Assistant Examiner* — Mark R Milia
(74) *Attorney, Agent, or Firm* — Oblon, Spivak, McClelland, Maier & Neustadt, L.L.P.

(57) ABSTRACT

An information processing apparatus that calculates importance of data based on a print log. A print-log database stores therein a print log of data printed. A calculating unit refers to the print log to check the number of times of printing the data, and calculates importance of the data based on the number of times of printing. A storing unit stores the importance of the data in an importance database.

12 Claims, 7 Drawing Sheets

FIG. 2

| DOCU-MENT ID | PRINT DATE | PRINTED PAGE | NUMBER OF PRINTS | PRINT OPTIONS | | |
|---|---|---|---|---|---|---|
| | | | | COLOR | LAYOUT | |
| 001 | 2005/04/01 13:00 | All | 1 | MONO-CHROME | NORMAL | DOUBLE SIDES |
| 005 | 2005/04/25 10:00 | 10-30 | 5 | COLOR | INTEN-SIVE | SINGLE SIDE |
| ... | | | | | | DOUBLE SIDES |

FIG. 3

| DOCUMENT ID | VIEWED PAGE | VIEW DATE | VIEW TIME (MINUTE) |
|---|---|---|---|
| 001 | All | 2005/04/01 13:00 | 120 |
| 005 | 10-30 | 2005/04/25 10:00 | 60 |
| 001 | 5-10 | 2005/04/30 09:00 | 30 |
| ... | | | |

$k_1$=1, $k_2$=1/4, IMPORTANCE CONSTANT 1=50
$k_3$=1, $k_4$=1/4, IMPORTANCE CONSTANT 2=100

ELAPSED TIME AFTER VIEWING=WEEK
PRINT-OPTION IMPORTANCE=if(COLOR="COLOR")5:0

| DOCUMENT ID | IMPORTANCE | UPDATE DATE |
|---|---|---|
| 001 | 111 | 2005/04/30 |
| 005 | 564 | 2005/04/30 |

FIG. 8

INFORMATION PROCESSING APPARATUS, INFORMATION PROCESSING METHOD, AND COMPUTER PROGRAM PRODUCT

CROSS-REFERENCE TO RELATED APPLICATIONS

The present document incorporates by reference the entire contents of Japanese priority documents, 2005-288133 filed in Japan on Sep. 30, 2005 and 2006-203806 filed in Japan on Jul. 26, 2006.

BACKGROUND OF THE INVENTION

1. Field of the Invention

The present invention relates to a technology for calculating importance of data.

2. Description of the Related Art

There are known technologies for calculating the importance of data.

For example, Japanese Patent Application Laid-open No. 2002-342379 discloses a technology for ranking the popularity of documents. According to the conventional technology, in addition to popularity obtained from document usage information based on similarity to a search keyword and a reference relation between documents, an expected value of future popularity is taken into account. Thus, accurate ranking can be achieved regardless of biased information even for a document with little information.

Japanese Patent Application Laid-open No. 2001-290843 discloses a document retrieval device that searches for document data from a document data group having a link relation. The document retrieval device weights the link relation, imparts link importance to the document data, and accesses the document data based on the link importance.

Japanese Patent Application Laid-open No. 2003-271653 discloses a technology in which documents in data are stored in association with an index indicating importance thereof. The documents are displayed in a list in order of the importance upon receipt of a request from a user. The importance of a document is increased when the document is requested, while the importance is reduced as the document is left unrequested.

However, in the technology disclosed in Japanese Patent Application Laid-open No. 2002-342379, only the document usage information is used, and therefore, it is not clear that the reader of the document has considered the document is useful after reading it.

With the document retrieval device disclosed in Japanese Patent Application Laid-open No. 2001-290843, the importance is determined based on the link relation. Therefore, the document retrieval device cannot be applied to a group of documents without links, i.e., those not linked to one another, such as documents referred to only within an office.

According to the technology disclosed in Japanese Patent Application Laid-open No. 2003-271653, only information on browse is used to calculate importance of a document. Therefore, it cannot be determined whether the reader has considered the document is important.

SUMMARY OF THE INVENTION

It is an object of the present invention to at least partially solve the problems in the conventional technology.

According to an aspect of the present invention, an information processing apparatus includes a print-log database that stores therein a print log of data printed, a calculating unit that refers to the print log to check number of times of printing the data and calculates importance of the data based on the number of times of printing, and a storing unit that stores the importance of the data in an importance database.

According to another aspect of the present invention, an information processing method includes referring to a print log of data printed to check number of times of printing the data, calculating importance of the data based on the number of times of printing the data, and storing the importance of the data.

According to still another aspect of the present invention, a computer program product includes a computer program that implements the above methods on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the drawings.

Figure 1:
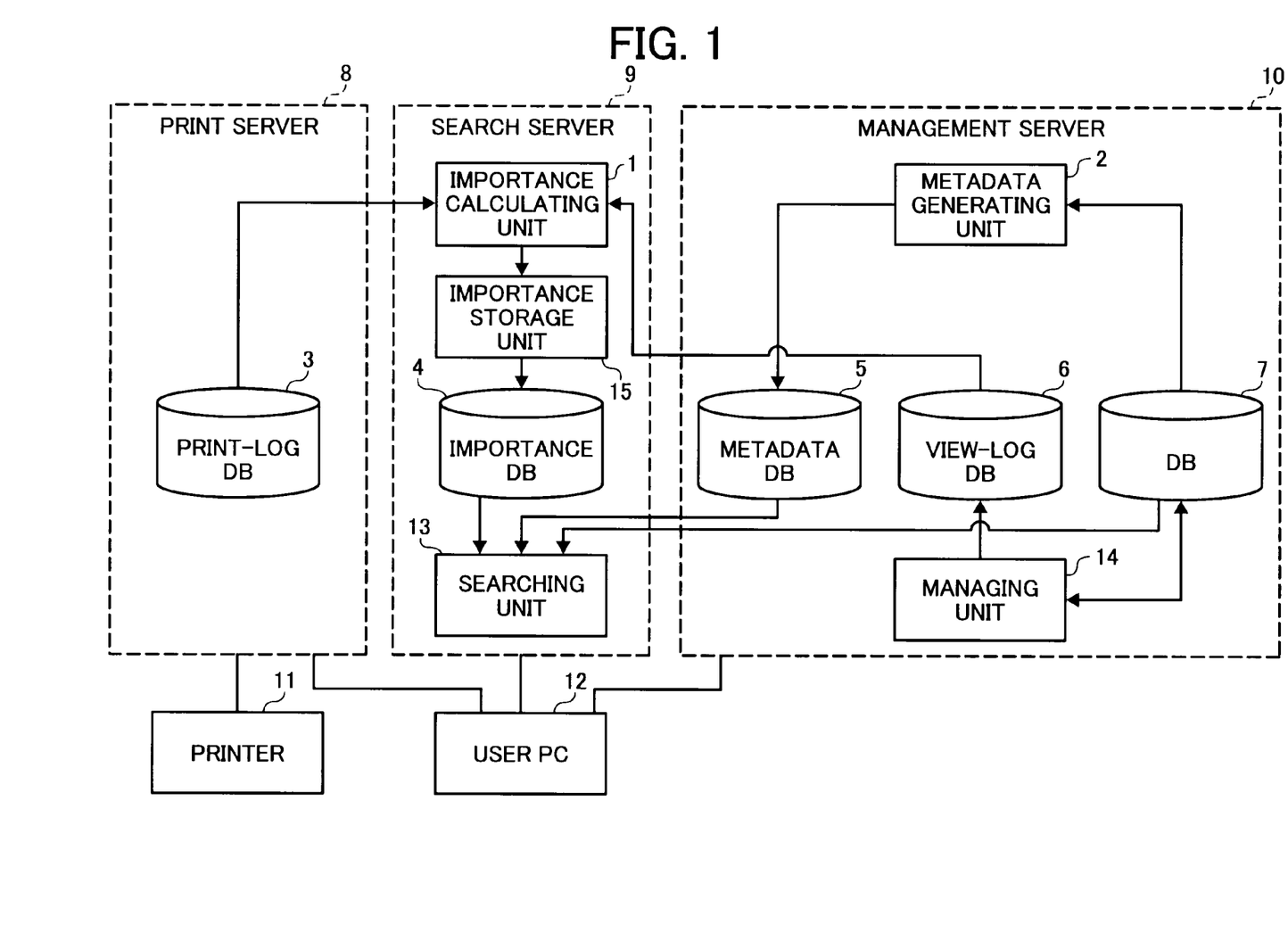
FIG. 1 is a block diagram of a data importance calculating system according to a first embodiment of the present invention.

FIG. 1 is a block diagram of a data importance calculating system according to a first embodiment of the present invention.

The data importance calculating system includes a print server 8, a search server 9, a management server 10, a printer 11, and a user personal computer (PC) 12, which are connected to a network such as the Internet.

The user PC 12 is connected to the print server 8, the search server 9, and the management server 10 according to the operation of the user. The search server 9 is connected to the print server 8 and the management server 10. The print server 8 is connected to the printer 11.

The user PC 12 is a general computer, and includes a controlling unit (not shown) that performs various operations and controls, an input unit (not shown) through which a user inputs information, a display unit (not shown) that displays information, and a storage unit (not shown) that stores various types of information. The storage unit stores therein an application, such as a web browser, that allows services from the search server 9 to be available.

The search server 9 provides a service of searching for or retrieving data such as document data in response to a search request with a keyword or a natural-language sentence input to the user PC 12 as a client. The configuration of the search server 9 is explained later.

The management server 10 manages data such as document data, and, in response to a request from the user PC 12, provides services including data registration, update and deletion, user management, and data viewing or browsing. The configuration of the management server 10 is explained later.

The print server 8 controls printing at the printer 11 based on a print instruction from the user PC 12. The print server 8 includes a print-log database 3 that stores therein print job history (print logs) for the printer 11. The print-log database 3 is stored in a storage medium, such as a hard disk drive (HDD) or memory.

Figure 2:
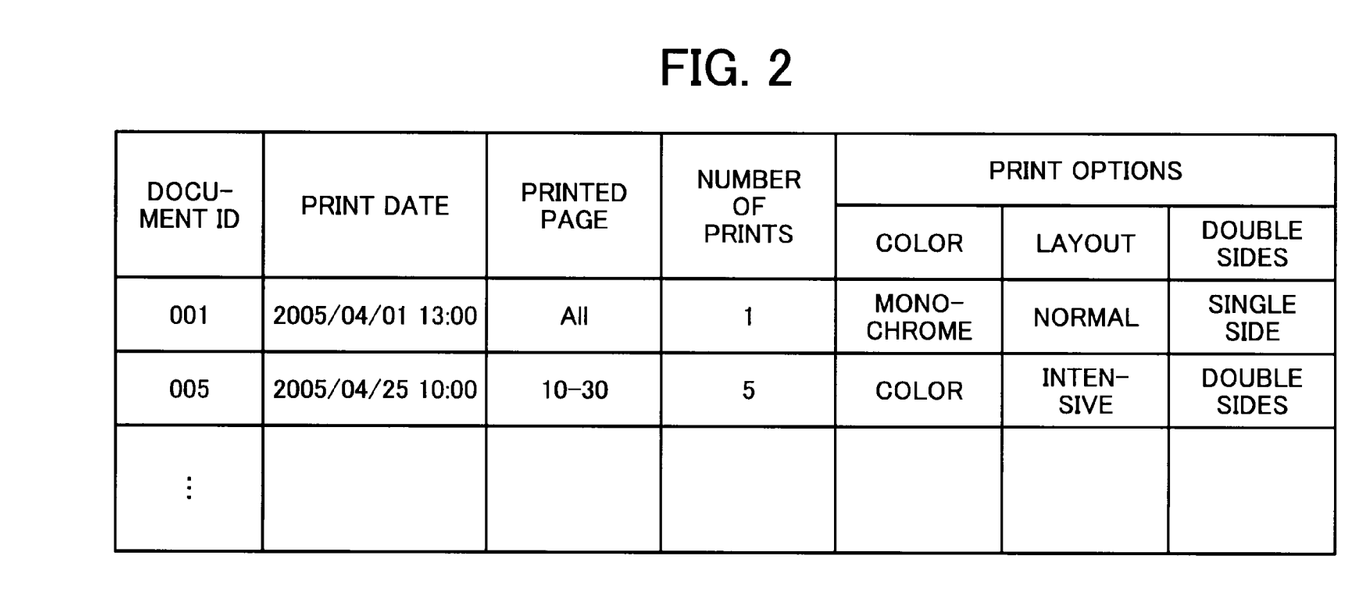
FIG. 2 is an example of contents of a print-log database shown in FIG. 1.

FIG. 2 is an example of contents of the print-log database 3. The print-log database 3 stores therein an identifier (ID) of printed data, print date, printed page, and print options. The print options are items for setting print conditions specified for printing. The print conditions include, for example, color or monochrome, layout such as normal or intensive printing, and single-sided or double-sided printing. In addition, one or more pages to be printed, the paper size, etc. can be specified by the items.

When the user operates the user PC 12 to search for a document the user desires to read, the user PC 12 is connected to the search server 9. The search server 9 connects to the management server 10 in response to a search request from the user via the user PC 12 to search for the document using any search method. The search server 9 then connects to the print servers 8 and the management server 10 to calculate importance (explained later) of documents contained in search results, and then sends the search results to the user PC 12. Based on the search results from the search server 9, the user operates the user PC 12 to connect to the management server 10, and accesses the document managed by the management server 10, thereby viewing the document. The user can operate the user PC 12 to issue a print instruction to the print server 8 to print the document.

The management server 10 includes a metadata generating unit 2, a metadata database 5, a view-log database 6, a database 7, and a managing unit 14.

The database 7 stores therein data such as document data. Documents can be written in a format to include a hyperlink, such as hypertext Markup Language (HTML). The first embodiment, however, is explained on the assumption that documents are written in plain text, such as theses or reports, without including a hyperlink or the like. The database 7 also stores therein information such as data creation date and data update date.

The metadata database 5 stores therein metadata to which information on data is written, and is stored in a recording medium such as HDD or memory.

The metadata generating unit 2 generates metadata corresponding to data upon registration of the data in the database 7, so that the metadata database 5 stores therein the generated metadata.

Figure 3:
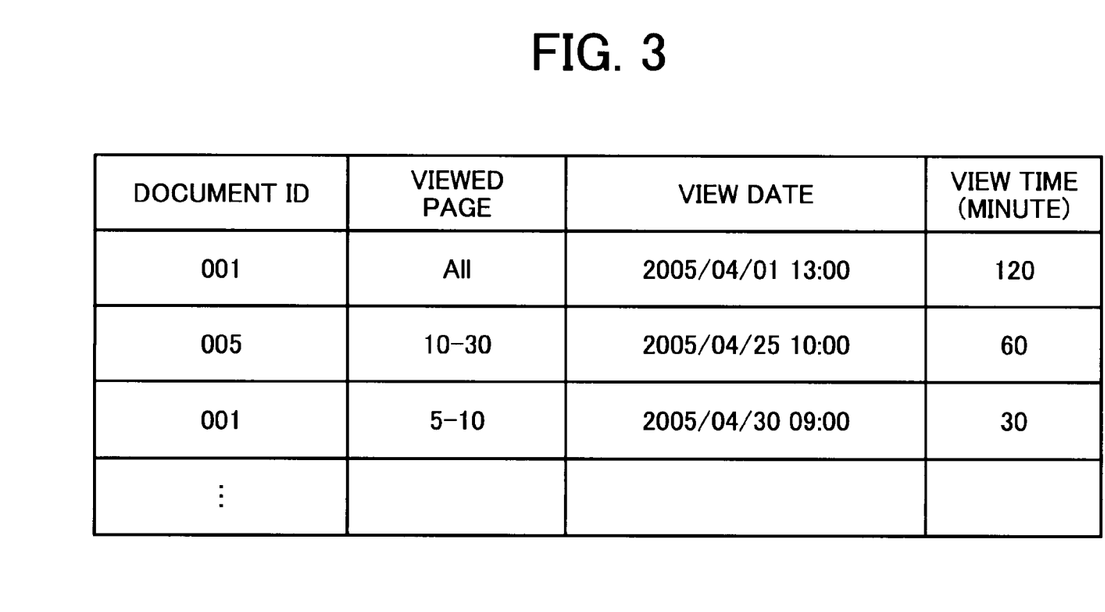
FIG. 3 is an example of contents of a view-log database shown in FIG. 1.

The view-log database 6 stores therein view history (view logs) of data stored in the database 7, and is stored in a recording medium such as HDD or memory. FIG. 3 is an example of contents of the view-log database 6. The view-log database 6 stores therein ID of viewed data, view date, viewed page, and a period of time of viewing data (view time).

The managing unit 14 performs data registration, update and deletion on the database 7, user management, and registration and update of a view log on the view-log database 6.

The search server 9 includes an importance calculating unit 1, an importance storage unit 15, an importance database 4, and a searching unit 13.

The importance calculating unit 1 calculates, for each data stored in the database 7, importance based on the view logs stored in the view-log database 6 and the print logs stored in the print-log database 3.

The importance storage unit 15 updates the importance of the data stored in the importance database 4 based on the importance calculated by the importance calculating unit 1.

In the first embodiment, the importance of data is determined based on intuition because users generally output data on paper when intuitively feeling that the data is important. For example, the user may print data after viewing the data. When the user is to print the data, the data can be of some value to the user. The user may print the data to show it to others, or the user may print the data to study it or to view it in an outside location.

For this reason, in the first embodiment, the importance calculating unit 1 uses not only the view logs but also the print logs to calculate the importance of data.

The importance calculating unit 1 calculates importance of data, for example, regularly, when the data is registered in the database 7, when the data in the database 7 is updated, when the data is printed, or after the data is viewed, or several of the above.

For example, when data is first registered in the database 7, no view log and print log is present for the data. Therefore, an average value of importance calculated in advance is given as an initial value of the importance of the data. When data stored in the database 7 is viewed or printed, only the importance of the data viewed or printed is updated. Update is regularly performed for all data registered in the database 7 or data that have not been recently updated.

A specific method of calculating the importance of data is explained. In the first embodiment, the importance of data is calculated based on the number of times of viewing data, the number of references or links to data, and an elapsed time from the generation or updating of data as data importance calculation criteria. The number of times of viewing data is obtained from the view logs stored in the view-log database 6. The number of references or links to data is obtained by analyzing the data stored in the database 7. The elapsed time from the generation or updating of data is obtained based on the data creation date and data update date stored in the database 7.

The importance of a document with a document ID=i (hereinafter, "document i") is calculated as follows:

$$\text{importance of document } i = f_3(\text{view log of document } i) + f_4(\text{print log of document } i) \quad (1)$$

The functions $f_4$ and $f_3$ are defined by, for example, Equations (2) to (5). The importance of document i obtained from the view log of document i (Equation (2)) is a total of importance values obtained from respective view logs of document i (Equation (4)). The importance of document i obtained from the print log of document i (Equation (3)) is a total of importance values obtained from respective print logs of document i (Equation (5)). The importance is lower for older logs, and Equations (4) and (5) are set so that the importance decreases as time elapses. Incidentally, the items for setting the print conditions in the print options are given a degree of relation with importance. The degree of relation is used to represent a print-option importance in Equation (5).

$$f_3 = \Sigma f_{3j} \quad (2)$$

$$f_4 = \Sigma f_{4j} \quad (3)$$

$$f_{3j} = k_{31} \times e^{-k_{32} \times elapsed\ time\ after\ viewing} \times \text{importance constant } 1 + k_{33} \quad (4)$$

$$f_{4j} = k_{41} \times e^{-k_{42} \times elapsed\ time\ after\ viewing} \times \text{number of prints} \times (\text{importance constant 2+print-option importance}) + k_{43} \quad (5)$$

Next, the searching unit 13 is explained.

The searching unit 13 searches for data based on data stored in the database 7 or metadata stored in the metadata database 5. An arbitrary algorithm can be used at the time of searching.

The searching unit 13 sorts search results before sending the search results to the user PC 12. To sort the search results, a sort value representing an arrangement order of data is used. The sort value is given to data that satisfies the search condition depending on the search method. The search results are sorted in decreasing order of sort values. In sorting the search results, data that is more closely related to a keyword, etc. used by the user for searching is ranked higher. For example, data that contains more keywords input by the user is ranked higher among the search results.

In the system according to the first embodiment, the sort value is corrected based on the importance given to data. That is, the sort value is increased for data with high importance. Therefore, the searching unit 13 uses importance stored in the importance database 4 to correct the sort value.

The sort value is given by Equation (6) as follows:

$$\text{sort value} = f_2(f_1(\text{keyword}), \text{importance}) \quad (6)$$

where $f_1$ (keyword) is a sort value obtained by a keyword in an existing search method, and $f_2$ is an arbitrary function satisfying the following Equations (7) and (8).

$$\frac{\partial}{\partial f_1(\text{keyword})}(f_2(f_1(\text{keyword}), \text{importance})) > 0 \quad (7)$$

$$\frac{\partial}{\partial \text{importance degree}}(f_2(f_1(\text{keyword}), \text{importance})) > 0 \quad (8)$$

Figure 4:
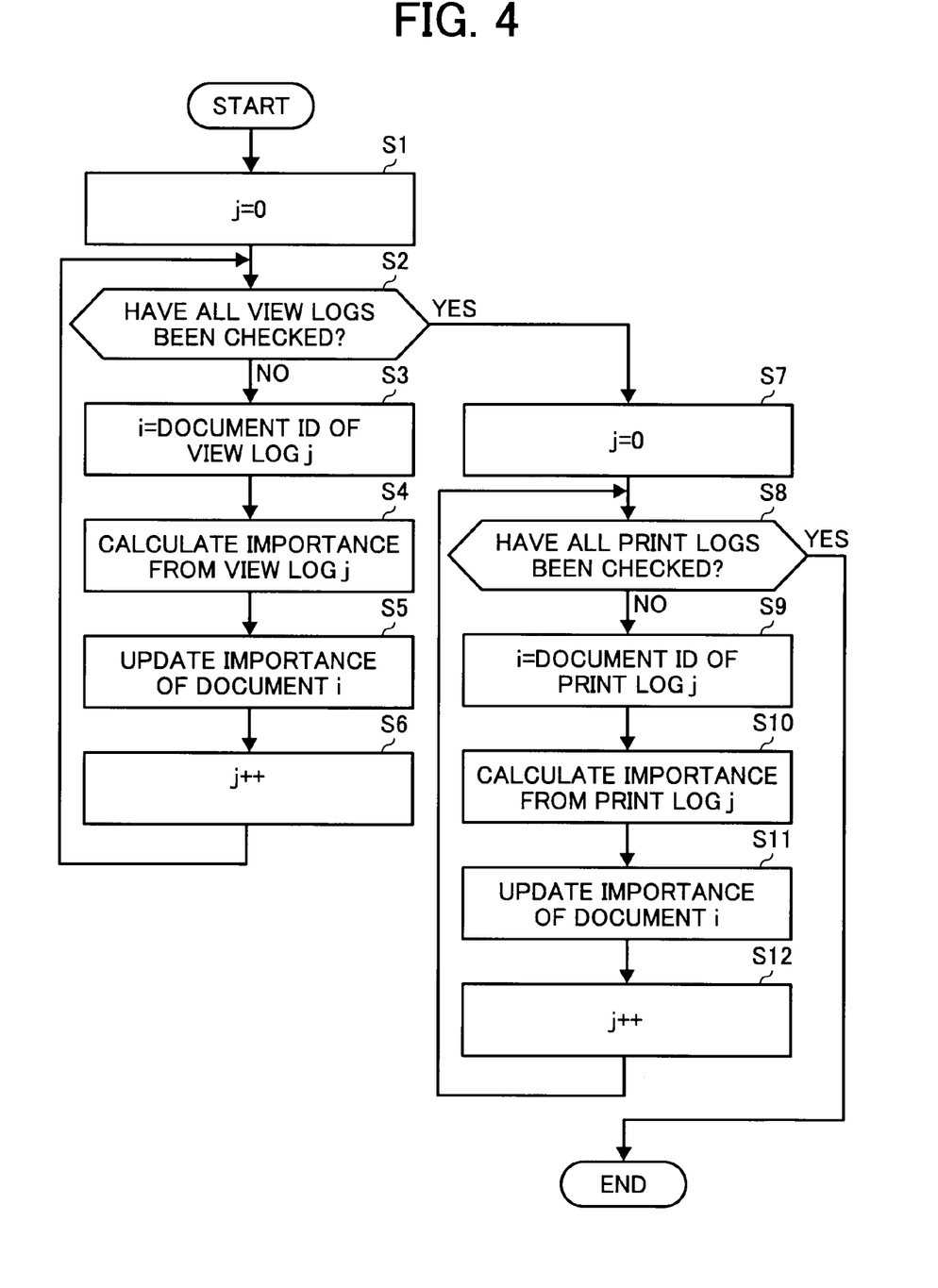
FIG. 4 is a flowchart of an importance updating process for all documents according to the first embodiment.

FIG. 4 is a flowchart of an importance updating process for all documents performed by the importance calculating unit 1.

The importance calculating unit 1 clears a page to 0 (step S1), and then accesses the view-log database 6 in the management server 10 to determine whether all view logs have been checked (step S2). If not, a document ID of a view log j (document i) is determined (step S3). The importance of document i is calculated based on Equations (1), (2), and (4) (step S4), and then the importance of document i is updated (step S5). Then, the page is incremented (step S6).

If all of view logs have been checked, the page is cleared to 0 (step S7). Then, by accessing the print-log database 3 in the print server 8, the importance calculating unit 1 determines whether all print logs have been checked (step S8). If not, a document ID of a print log j (document i) is determined (step S9). With the print log j, the importance of document i is calculated based on Equations (1), (3), and (5) (step S10), and the importance of document i is updated (step S11). Then, the page is incremented (step S12). After the importance calculating unit 1 has checked all the print logs, the importance storage unit 15 updates the importance of each document stored in the importance database 4.

Figure 5:
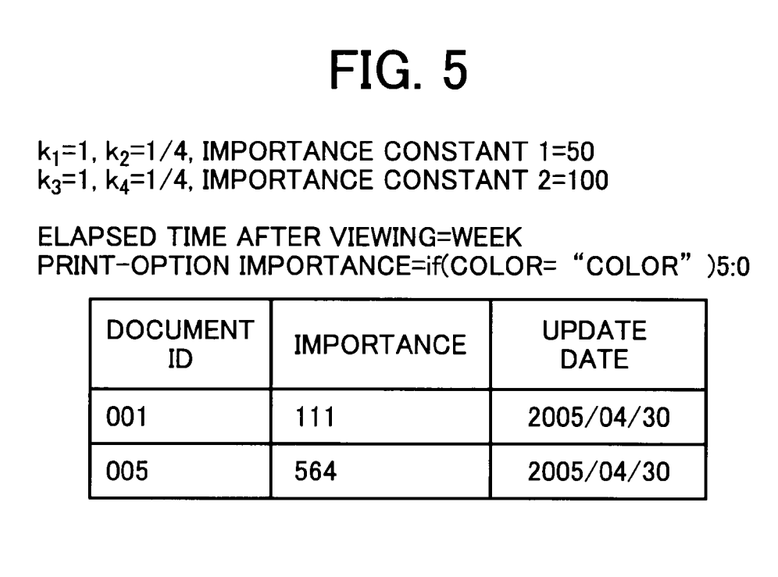
FIG. 5 is a table that indicates importance of documents obtained from view logs shown in FIG. 3 and print logs shown in FIG. 2.

FIG. 5 is a table that indicates an example of the importance of documents obtained as a result of the above process from the view-logs in FIG. 3 and the print logs in FIG. 2. In this example, a document 005 (document ID: 005) with a larger number of prints has importance higher than that of a document 001 (document ID: 001) with a larger number of times of viewing.

Figure 6:
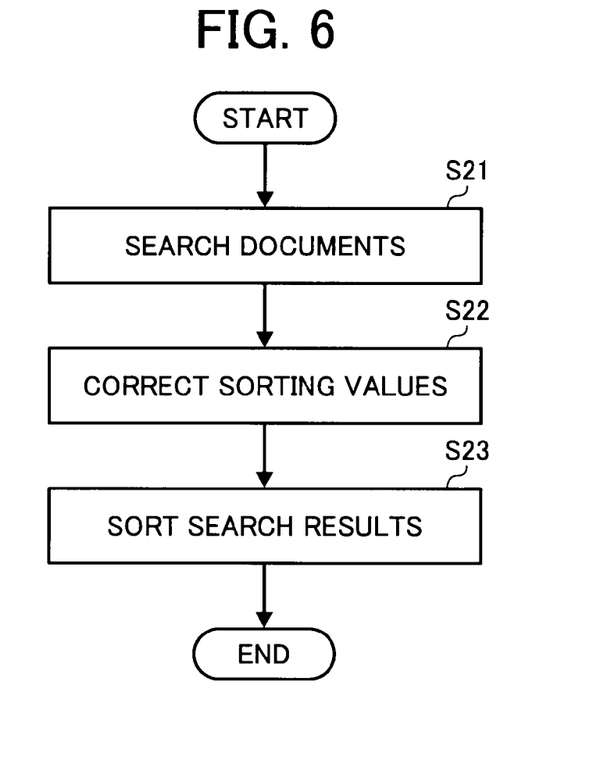
FIG. 6 is a flowchart of a document search process according to the first embodiment.

FIG. 6 is a flowchart of a document search process according to the first embodiment.

The searching unit 13 of the search server 9 searches, upon receipt of a search request from the user PC 12, the metadata database 5 or the database 7 for documents that satisfies the search condition (step S21). The sort values of search results are obtained based on Equations (6) to (8) for correction (step S22). Then, the search results are sorted based on the corrected sort values (step S23). The sorted search results are provided to the user PC 12.

As explained above, according to the first embodiment, the importance of data is calculated based on not only view logs but also print logs. Thus, it is possible to obtain the importance reflecting the user's feeling with respect to the importance of data. Based on the importance, search results are sorted, which improves usability for the user.

Next, a modification of the first embodiment is explained.

In the database 7, data with a setting of print authorization can be registered. For example, data that is available for viewing but not to be printed can be registered. In this case, the criteria for calculating the importance of data can be changed. For example, if data is not allowed to be printed, the importance obtained from printing is not considered, and therefore, the importance obtained from view logs is increased. For example, an importance constant 1 in Equation (4) is increased, and the importance is increased for data with a longer view time as follows:

$$f'_{3j} = k_{31} \times e^{-k_{32} \times elapsed\ time\ after\ viewing} \times \frac{\text{viewing time}}{\text{average viewing time per page} \times \text{number of pages viewed}} \times \text{importance constant } 1' + k_{33} \quad (9)$$

$$\text{importance constant } 1' > \text{importance constant } 1 \quad (10)$$

Besides, in the database 7, data with a setting of view authorization can be registered. For example, data that is accessible to only authorized users can be registered. Also in this case, the criteria for calculating the importance of data can be changed. For example, when viewers are restricted, the number of times of viewing data and the number of prints are decreased. Therefore, the importance of the data is corrected according to the number of users allowed to view the data by, for example, the following Equation (11):

$$\text{importance of document } i = \frac{\text{number of users using document management server}}{\text{number of users allowed to view document } i} \times \text{importance of document } i \quad (11)$$

Thus, the importance of data can be calculated irrespective of restrictions on access to data.

As another modification of the first embodiment, the importance of a document can be calculated for each page. For example, if viewed pages in the view log of document i includes page j, or if print pages in the print log of document i includes page j, the importance of document i for each page is obtained by the following Equation (12):

$$\text{importance of page } j \text{ of document } i = f_5 \text{ (view log of page } j \text{ of document } i) + f_6 \text{ (print log of page } j \text{ of document } i) \quad (12)$$

The functions $f_5$ and $f_6$ are defined by, for example, the following Equations (13) to (16):

$$f_5 = \Sigma f_{5k} \quad (13)$$

$$f_6 = \Sigma f_6 k \quad (14)$$

$$f_5 k = k_{51} \times e^{-k_{52} \times \text{elapsed time after viewing}} \times \text{importance constant } 1 + k_{53} \quad (15)$$

$$f_6 k = k_{61} \times e^{-k_{62} \times \text{elapsed time after viewing}} \times \text{number of prints} \times (\text{importance constant } 2 + \text{print-option importance}) + k_{63} \quad (16)$$

As explained above, a page with the highest importance or a summary of that page is presented in addition to search results, which helps the user understand the gist of a document.

In the first embodiment, the importance calculating unit 1 accumulates the number of prints for each data when the importance of the data is calculated, and uses the total number of prints as the number of times of printing. However, this embodiment is not so limited. The number of prints already accumulated for each data can be used as the number of times of printing. Also, for example, the frequency of printing per unit time can be calculated for each data as the number of times of printing.

The data importance calculating system is explained above as hardware; however, it can be implemented as software. In other words, a computer program can be executed on a computer or a server including each unit to realize the same function as the data importance calculating system including the importance calculating unit 1, the importance storage unit 15, the searching unit 13, and the metadata generating unit 2.

Besides, instead of the search server 9, the management server 10 can include at least one of the importance calculating unit 1, the importance storage unit 15, and the importance database 4. The data importance calculating system can include another server including at least one of the importance calculating unit 1, the importance storage unit 15, and the importance database 4. Similarly, the search server 9 or another server can include the metadata generating unit 2 or the print-log database 3.

Figure 7:
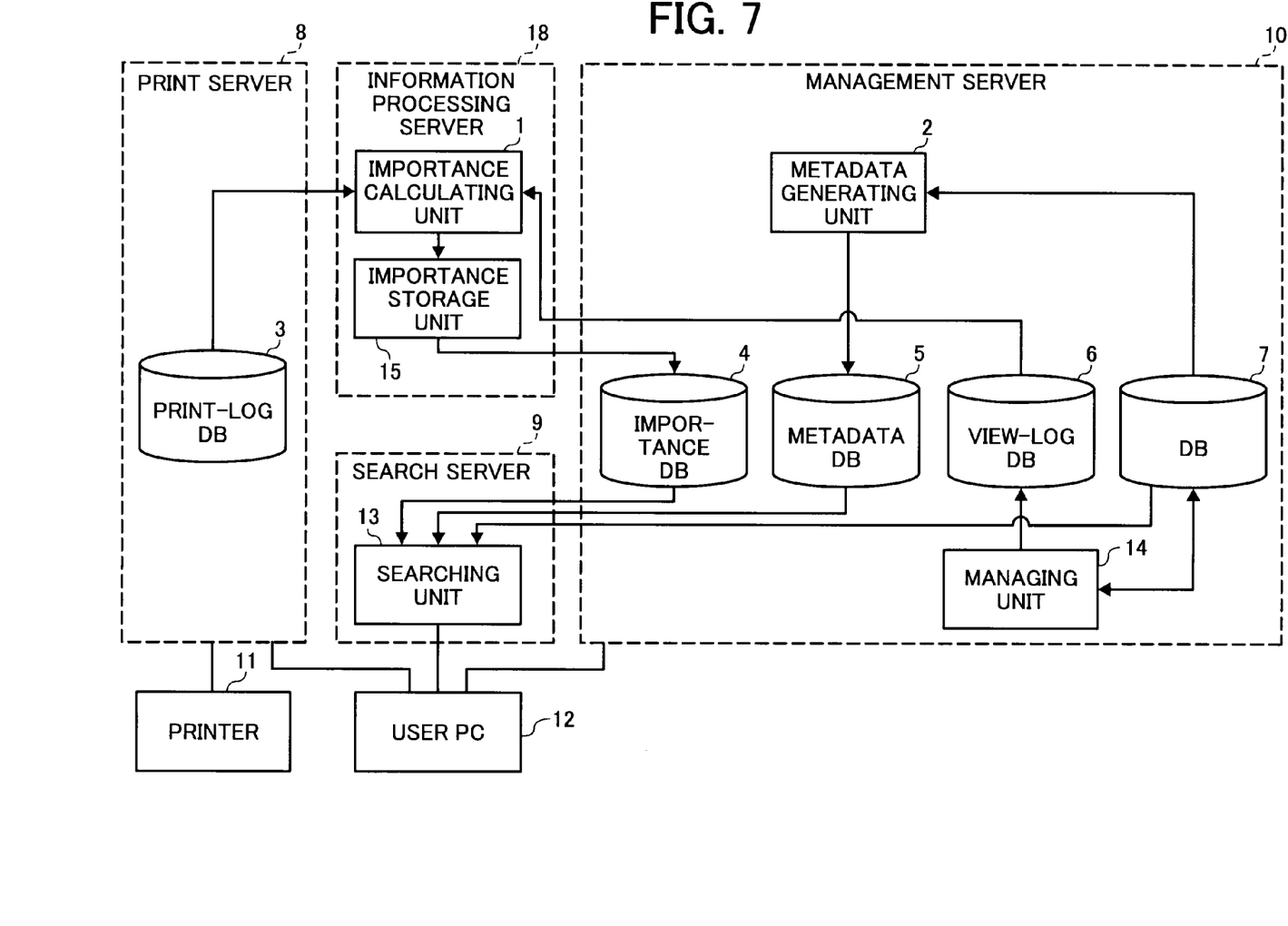
FIG. 7 is a block diagram of a data importance calculating system according to a modification of the first embodiment.

For example, the data importance calculating system can be configured as shown in FIG. 7. In FIG. 7, the data importance calculating system further includes an information processing server 18. The information processing server 18 includes the importance calculating unit 1 and the importance storage unit 15. The search server 9 includes the searching unit 13. The management server 10 includes the importance database 4.

In addition, a print instruction can be sent to the print server 8 through the management server 10. That is, the user PC 12 can send a print instruction to the management server 10, so that the management server 10 instructs the print server 8 to perform printing.

Figure 8:
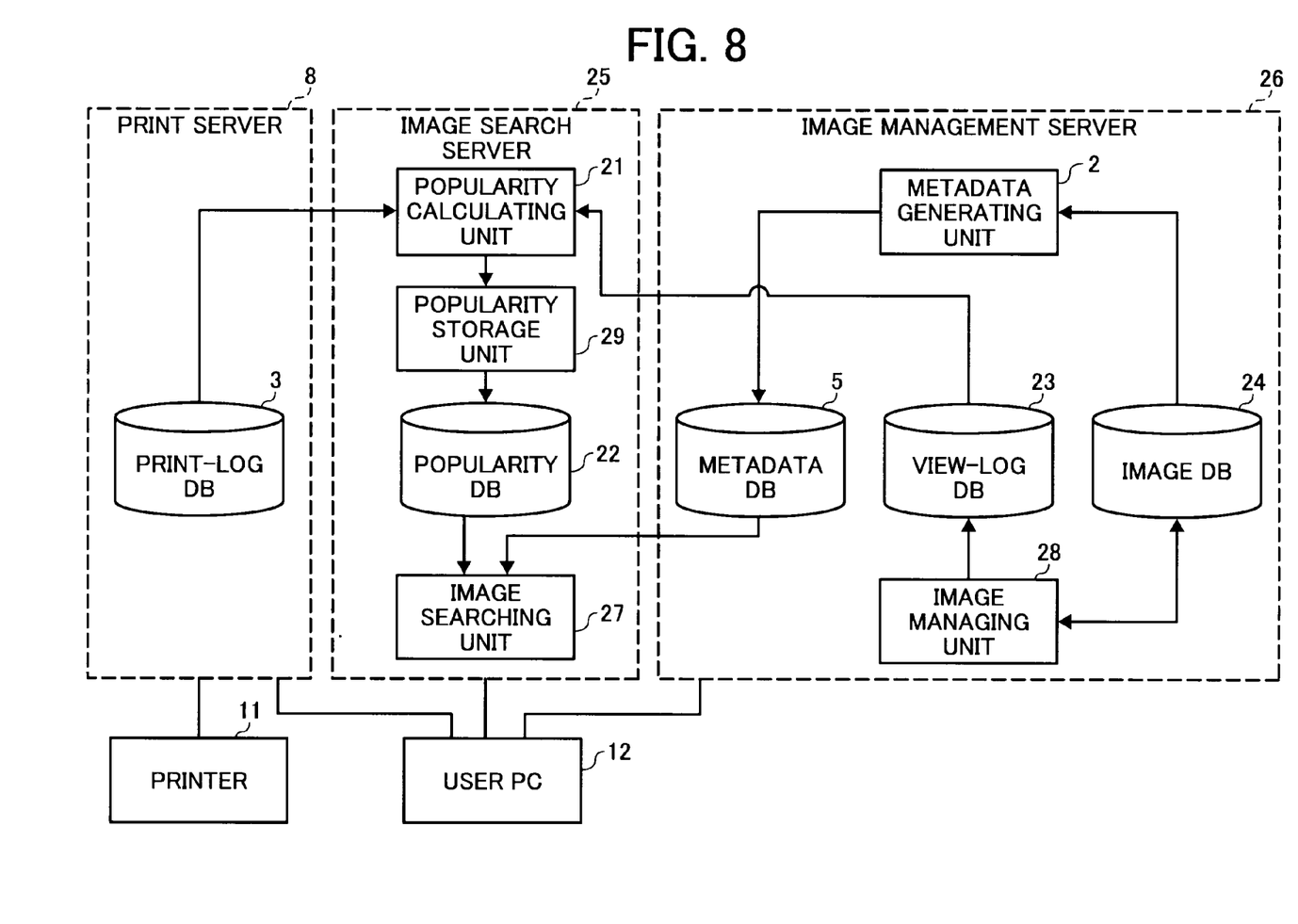
FIG. 8 is a block diagram of a data importance calculating system according to a second embodiment of the present invention.

FIG. 8 is a block diagram of a data importance calculating system according to a second embodiment of the present invention. In the second embodiment, the data importance calculating system is applied to digital images (hereinafter, "images"), such as photographs. The data importance calculating system of the second embodiment is basically similar to that of the first embodiment; like reference numerals designate like parts, and the same description is not repeated.

The data importance calculating system of the second embodiment includes the print server 8, an image search server 25, an image management server 26, the printer 11, and the user PC 12.

The image management server 26 includes the metadata generating unit 2, the metadata database 5, a view-log database 23, an image database 24, and an image managing unit 28.

The image database 24 stores therein image data, and is stored in a storage medium such as HDD or memory. The metadata database 5 stores therein metadata of images. For example, the metadata is document data in the eXtensible Markup Language (XML) format including a file name, title, creation date, shot place for an image, and the like. Some of the metadata can include a tag representing a feature of an image.

The view-log database 23 stores therein view history (view logs) of an image stored in the image database 24, and is stored in a storage medium such as HDD or memory.

The image managing unit 28 performs image data registration, update deletion on the image database 24, user management, and registration and update of a view log on the view-log database 23.

The image search server 25 includes a popularity calculating unit 21, a popularity storage unit 29, a popularity database 22, and an image searching unit 27.

The popularity database 22 stores therein information on the popularity of an image, and is stored in a storage medium such as HDD or memory.

The popularity calculating unit 21 calculates the popularity of the image stored in the image database 24 based on the print logs stored in the print-log database 3 and the view logs stored in the view-log database 23. The popularity can be calculated in basically the same manner as described previously for the calculation of importance in the first embodiment. The time to calculate the popularity is also the same as described previously for calculating importance in the first embodiment. An initial value of the popularity of an image is, as in the first embodiment, an average value of popularities calculated in advance.

The popularity storage unit 29 updates the popularity stored in the popularity database 22 based on the popularity calculated by the popularity calculating unit 21.

The image searching unit 27 searches for an image stored in the image database 24 based on the metadata stored in the metadata database 5. For example, when the metadata of an image includes a tag representing a feature of that image, the image searching unit 27 performs a keyword search based on the tag. Alternatively, the image searching unit 27 performs a search using the file name of an image as a key. After the image search, the image searching unit 27 uses the popularity of the image stored in the popularity database 22 to sort search results as in the first embodiment, and sends the sorted search results to the user PC 12.

The user can view the search results provided to the user PC 12 as preview of digital images. To view the digital images, the user operates the user PC 12 to connect to the image management server 26, and downloads the images from the image management server 26 to the user PC 12. Consequently, the user can view the images. The user can store an image in HDD or print an image according to user's preferences.

As explained above, the search results are sorted based on popularity calculated for images. Thus, sorting can be performed while more effectively reflecting the popularity of the images.

As a modification of the second embodiment, a document with an image attached thereto can be a search target. In this case, the image searching unit 27 can perform a search based on information written in the document, and sort search results based on the popularity, stored in the popularity database 22, corresponding to images included in the search results.

With this configuration, even for a document with an image attached thereto, sorting is performed based on the popularity calculated for the image. Thus, sorting can be performed while more effectively reflecting the popularity of the image.

The data importance calculating system is explained above as hardware; however, it can be implemented as software. In other words, a computer program can be executed on a computer or a server including each unit to realize the same function as the data importance calculating system including the popularity calculating unit 21, the popularity storage unit 29, and the image searching unit 27.

Besides, the image management server 26, instead of the image search server 25, can include at least one of the popularity calculating unit 21, the popularity storage unit 29, and the popularity database 22. The data importance calculating system can include another server including at least one of the popularity calculating unit 21, the popularity storage unit 29, and the popularity database 22.

While the embodiments are described on the assumption that data is document or image data, such data is cited merely by way of example and without limitation. Data can be tables, computer programs, files, directories and the like.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a print-log database that stores therein a print log of data printed;
   a view-log database that stores a view log of data;
   a calculating unit that refers to the print log to check a number of times of printing the data and the view log to check a time when the data was last updated or generated, and calculates an importance of the data based on calculation criteria including the number of times of printing and an elapsed time since the data was last updated or generated;
   a storing unit that stores the importance of the data in an importance database; and
   a searching unit that searches for data satisfying a search condition input by a user and sorts a plurality of search-result data obtained by the search based on the search condition input by the user and the importance of the data for each of the search-result data stored in the importance database,
   wherein each of the search-result data is assigned with a sort value and the plurality of search-result data is sorted based on an order of the sort values, and the searching unit adjusts the sort values for the search-result data based on the search condition input by the user and the importance of the data stored in the importance database, and sorts the search-result data based on the adjusted sort values,
   wherein
   the print log includes a print option setting specified for printing,
   the print option setting is assigned a print option importance value, and
   the calculating unit calculates the importance of the data using the print option importance value as part of the calculation criteria.

2. The information processing apparatus according to claim 1, wherein the calculating unit refers to the print log to check a total number of prints, and determines the total number of prints as the number of times of printing.

3. The information processing apparatus according to claim 1, wherein the calculation criteria further includes at least one of number of times of viewing the data, number of references to the data, and number of links to the data.

4. The information processing apparatus according to claim 3, wherein
   the calculating unit refers to the view log to check the number of times of viewing the data.

5. The information processing apparatus according to claim 1, wherein the calculating unit changes the calculation criteria for the importance of the data based on any one of authorization to view the data and authorization to print the data or both.

6. The information processing apparatus according to claim 1, wherein the calculating unit calculates importance with respect to each print page of the data.

7. The information processing apparatus according to claim 1, wherein the data includes document data, image data, and document data containing an image.

8. The information processing apparatus according to claim 1, wherein the calculation criteria includes a calculation based on a viewing time of a document stored in the view log multiplied by an importance constant, the data includes a setting of print authorization which indicates whether or not the data is available for viewing but not for printing, and when the data is not available for printing, the importance constant is increased.

9. The information processing apparatus according to claim 1, wherein the data includes a setting of viewing authorization which indicates whether or not data is accessible only to authorized users, and when the data is restricted to authorized users, an importance obtained from the view logs is adjusted according to the number of users allowed to view the data.

10. The information processing apparatus according to claim 1, wherein the view log includes information of individual pages of the data that are viewed, the print log includes information of individual pages of the data that are printed, an importance of the data is calculated for each page of the data based on the view log and the print log, and the search result data includes an indication of a page having the highest importance.

11. An information processing method, implemented on an information processing apparatus, comprising:
   referring, at the information processing apparatus, to a print log of data printed to check a number of times of printing the data;
   referring, at the information processing apparatus, to a view log of the data to check a time when the data was last updated or generated;
   calculating, at the information processing apparatus, an importance of the data based on calculation criteria including the number of times of printing the data and an elapsed time since the data was last updated or generated;
   storing, at the information processing apparatus, the importance of the data; and searching, at the information processing apparatus, for data satisfying a search condition input by a user and sorting a plurality of search-result data obtained by the search based on the search condition input by the user and the importance of the data for each of the search-result data that is stored, wherein each of the search-result data is assigned with a sort value and the plurality of search-result data is sorted based on an order of the sort values, and the method further comprises adjusting the sort values for the search-result data based on the importance of the data that is stored and the search condition input by the user, and sorting the search-result data based on the adjusted sort values, wherein the print log includes a print option setting specified for printing, the print option setting is assigned a print option importance value, and the calculating includes calculating the importance of the data using the print option importance value as part of the calculation criteria.

12. A non-transitory computer readable storage medium encoded with computer executable instructions, which when executed by a computer, cause the computer to perform a method comprising:

referring to a print log of data printed to check a number of times of printing the data;

referring to a view log of the data to check a time when the data was last updated or generated;

calculating an importance of the data based on calculation criteria including the number of times of printing the data and an elapsed time since the data was last updated or generated;

storing the importance of the data; and searching for data satisfying a search condition input by a user and sorting a plurality of search-result data obtained by the search based on the search condition input by the user and the importance of the data for each of the search-result data that is stored, wherein each of the search-result data is assigned with a sort value and the plurality of search-result data is sorted based on an order of the sort values, and the method further comprises adjusting the sort values for the search-result data based on the importance of the data that is stored and the search condition input by the user, and sorting the search-result data based on the adjusted sort values, wherein the print log includes a print option setting specified for printing, the print option setting is assigned a print option importance value, and the calculating includes calculating the importance of the data using the print option importance value as part of the calculation criteria.

* * * * *